(12) United States Patent
Woodrow

(10) Patent No.: US 6,401,825 B1
(45) Date of Patent: Jun. 11, 2002

(54) MARINE RISER

(75) Inventor: Timothy John Woodrow, Aberdeenshire (GB)

(73) Assignee: Petroleum Equipment Supply Engineering Company Limited (GB)

( * ) Notice: Subject to any disclaimer, the term of this patent is extended or adjusted under 35 U.S.C. 154(b) by 0 days.

(21) Appl. No.: 09/424,346

(22) PCT Filed: May 22, 1998

(86) PCT No.: PCT/GB98/01375

§ 371 (c)(1),
(2), (4) Date: Feb. 10, 2000

(87) PCT Pub. No.: WO98/53176

PCT Pub. Date: Nov. 26, 1998

(30) Foreign Application Priority Data

May 22, 1997 (GB) .............................................. 9710440

(51) Int. Cl.[7] ...................... E21B 33/038; E21B 33/076
(52) U.S. Cl. .......................... 166/350; 166/367; 166/380
(58) Field of Search ................................ 166/350, 345, 166/359–361, 365, 367, 380–382; 285/19, 24, 25, 27, 28, 39

(56) References Cited

U.S. PATENT DOCUMENTS

| 3,602,175 A | * | 8/1971 | Morgan et al. | |
| 3,611,976 A | | 10/1971 | Hale | 114/235 |
| 3,712,261 A | * | 1/1973 | McLelland et al. | |
| 3,859,949 A | | 1/1975 | Toussaint et al. | 114/235 |
| 3,962,982 A | | 6/1976 | Marchay et al. | 114/235 |
| 4,078,605 A | | 3/1978 | Jones | |
| 4,171,674 A | | 10/1979 | Hale | 114/243 |
| 4,330,140 A | | 5/1982 | Hampton | 285/39 |
| 4,397,357 A | | 8/1983 | Hettinger | 166/345 |
| 4,398,487 A | | 8/1983 | Ortloff et al. | 114/243 |
| 4,474,129 A | | 10/1984 | Watkins et al. | 114/243 |
| 4,496,173 A | | 1/1985 | Roche et al. | 385/24 |
| 4,610,467 A | | 9/1986 | Reimert | 285/24 |
| 4,662,785 A | | 5/1987 | Gibb et al. | 405/195 |
| 4,712,620 A | * | 12/1987 | Lim et al. | |
| 5,390,966 A | | 2/1995 | Cox et al. | 285/137.1 |

FOREIGN PATENT DOCUMENTS

| CA | 1059841 | * | 8/1979 | 114/46.7 |
| GB | 2053318 | | 2/1981 | E21B/7/12 |
| GB | 2119466 | * | 11/1983 | |
| GB | 2135748 | * | 9/1984 | |

* cited by examiner

Primary Examiner—Roger Schoeppel
(74) Attorney, Agent, or Firm—Piper Rudnick; Jefferson Perkins

(57) ABSTRACT

A marine riser has couplings with screw-threads for securing marine riser sections together, and a carousel mechanism for coupling auxiliary lines to the marine riser sections at various locations along the sections to permit the lines to rotate freely relative to the marine riser sections as the sections are rotatably assembled. The marine riser also has a buoyancy module which houses choke and kill lines in buoyancy module fairing portions.

35 Claims, 7 Drawing Sheets

PRIOR ART ated freely relative to the marine riser sections as the sections are rotatably assembled.

MARINE RISER

TECHNICAL FIELD OF THE INVENTION

The present invention relates to marine risers, and in particular to ccuplings for connecting marine riser section together. In particular, the marine riser may be used for drilling or for workover/completion.

BACKGROUND

Marine risers are conduits which connect an oil rig or vessel to a blow out preventer (BOP) which is stationed on or near the ocean bed. Marine risers consist of a large bore pipe or conduit. Marine risers also have additional (auxiliary) lines (such as choke, kill, and hydraulic lines) which are secured to the marine riser at regular intervals throughout its length.

Marine risers vary in size from approximately 13 3/8 inches O.D. to 24 inches O.D. and may need to be up to 10,000 feet long for deep water sites, so they are stored in sections. The marine riser sections are typically 15 to 25 metres long and are situated on the oil rig or vessel for assembly when required. Thus, when a mariner riser is to be assembled for a deep water site, up to approximately 200 joints may be needed if 15 m marine riser sections are used. It will be appreciated that such joints require to be quickly assembled and to have excellent seal integrity over a prolonged period of time to prevent either ingress of sea water or loss of drilling mud. In addition, the choke and kill lines must be 100% reliable and seal under all conditions to implement the "well control" procedure.

Existing marine risers are assembled using one of two types of couplings. The first type of coupling is the flange coupling, where each marine riser section has a flange to each end. Marine riser sections are connected by bolting the flanges together. The second type of coupling is the mechanical coupling arrangement which uses actuatable dogs in one end of a marine riser section to engage a recess in one end of a different riser section.

An example of a flange coupling arrangement is shown in FIG. 1a, and an example of a mechanical dog-type coupling arrangement is shown in FIG. 1b (which is a Cameron Iron Works Inc. riser joint assembly).

In the flange coupling arrangement of FIG. 1a, when two marine riser sections are to be joined, the corresponding flanges from each riser section are brought together, the flanges are aligned, and they are bolted together or otherwise clamped in placed. This is a time consuming process, and also the flanges required to form a secure connection are both large in size and heavy in weight.

The mechanical coupling arrangement provides for easier and faster make-up but is more complex, much more expensive to manufacture, and has a lower maximum load rating than the flange coupling arrangement.

However, these two types of coupling arrangements allow the additional (auxiliary) lines (such as the choke, kill, hydraulic, and mud booster lines) to be permanently secured parallel to the marine riser at various locations along its length, and the auxiliary lines are automatically aligned as marine riser sections are continuously added to the marine riser during assembly.

Recently, threaded connectors similar to those used in drilling tubulars have been used on production risers where provision of gas tightness is essential; however, the use of threaded connectors has been limited to risers of small diameter (O.D. 10 1/4 inches) to the platform.

SUMMARY OF THE INVENTION

An object of the present invention is to provide an improved riser coupling which obviates or mitigates one of the aforementioned disadvantages associated with existing couplings.

This is achieved by using couplings having screw-threads for securing marine riser sections together and by coupling the auxiliary lines to the marine riser sections at various locations along the sections to permit the lines to rotate freely relative to the marine riser sections as the sections are rotatably assembled.

Screw-thread couplings are less expensive to manufacture and provide a stronger connection than either the flange or the mechanical couplings for a given weight allowance. They also provide faster coupling and are lighter than existing couplings for a given load rating.

According to a first aspect of the present invention a marine riser comprising: a plurality of marine riser sections, each marine riser section having screw-threaded ends and coupling means for connecting said screw-threaded ends together; rotary drive coupling means for engaging with a rotary drive mechanism; each marine riser section having a plurality of spaced brackets secured to the marine riser section along its length; auxiliary line support means for receiving at least one auxiliary line, said auxiliary line support means being rotatably mounted to said spaced brackets whereby, when two marine riser sections are coupled together by rotary movement the auxiliary line support means is free to rotate relative to the riser sections to minimise rotary forces being applied to the auxiliary lines and allow vertical alignment of auxiliary lines for connection.

Preferably, an auxiliary lines coupling mechanism is provided for coupling auxiliary lines on adjacent riser sections together.

Preferably, the auxiliary line support means is a rotary carousel mechanism which comprises an annular disc with a clamp corresponding to each auxiliary line for receiving an auxiliary line. Conveniently, the clamp is large enough to accommodate the coupling mechanism for the auxiliary lines.

Conveniently, the auxiliary lines coupling mechanism is a sliding sleeve. Alternatively, all auxiliary lines may be simultaneous lifted upwards within the carousel mechanism by a hydraulic/pneumatic jacking system to provide access for the rotary drive mechanism. In this case when the auxiliary lines are subsequently lowered a threaded connection with a "hammer union" system, such as a FMC Dynetor or WECO coupling may be used to provide a metal-to-metal seal.

Preferably, the male and female screw-threaded ends have tapered screw-threads, conveniently, self-aligning tapered screw-threads. Alternatively, said male and female screw-threaded ends have parallel screw-threads.

Preferably, the male and female screw-threaded ends are welded to the riser sections.

Preferably, the rotary drive coupling means is a circumferential toothed rack. Alternatively, the rotary drive coupling means is a vertical keyway into which drive keys can be engaged.

Preferably, the rotary drive mechanism comprises rotary drive pinions and a drive unit. Alternatively, the rotary drive mechanism comprises a drive keys that are driven by a "split ring" which, in turn, is hydraulically or pneumatically driven.

Preferably, the auxiliary line support means is mounted in the spaced brackets by hydraulic bearings. Alternatively, these bearings may be pneumatic or mechanical.

According to a second aspect of the present invention there is provided a marine riser section having screw-threaded ends and coupling means for connecting said screw-threaded ends together; rotatable drive coupling means for engaging with a rotary drive mechanism; a plurality of spaced brackets secured to the marine riser section along its length; auxiliary line support means for receiving at least one auxiliary line, said auxiliary line support means being rotatably mounted to said spaced brackets, whereby the auxiliary line support means is free to rotate relative to the riser section to minimise rotary forces being applied to the auxiliary lines and allow easy rotation of auxiliary lines to enable connection of the sliding sleeve mechanism.

Preferably, the auxiliary line support means is a rotary carousel mechanism which comprises an annular disc with a clamp corresponding to each auxiliary line for receiving an auxiliary line with a clamp in each guide for receiving an auxiliary line. Conveniently, the clamp is large enough to accommodate the auxiliary lines coupling mechanism.

According to a third aspect of the present invention there is provided a method of connecting marine riser sections together to form a marine riser, said method comprising the steps of: supporting a first riser section to display a first screw-thread end for coupling; locating a second riser section above the first riser section, where the second riser section has a second differential screw-thread end for coupling to the said first end; rotating said second riser section such that the first and second ends from a screw-thread coupling; and coupling at least one auxiliary line to the riser section and allowing the auxiliary line to rotate freely relative to the riser to facilitate vertical alignment with adjacent riser sections.

Preferably, the first riser section is supported by means of a riser spider. Conveniently, the riser spider may be achieved to support the first riser section and retracted to release the first riser section.

According to a fourth aspect of the present invention there is provided a fairing for use with a marine riser, the fairing comprising a first generally cylindrical portion for coupling to the riser and a second tapered portion coupled to the first portion, the fairing including buoyant material.

Preferably, the first and second portions are moulded from buoyant material. Alternatively, only one portion is moulded from buoyant material.

Preferably, the second portion has an insert made of buoyant material.

Preferably, the buoyant material is non-absorbent, conveniently the non-absorbent buoyant material is syntactic foam.

According to a fifth aspect of the present invention there is provided a fairing-shaped buoyancy module for use with a marine riser, said buoyancy module having carousel coupling means for coupling the buoyancy module to a carousel mechanism mounted on said riser, said buoyancy module being rotatable relative to said riser, said buoyancy module having a tapering fairing portion coupled to the carousel coupling means, the tapering portion being formed of a buoyant material and defining within the boundary of the tapering portion at least one passageway for an auxiliary line. The tapering portion can include a plurality of passageways for receiving a plurality of auxiliary lines. The buoyancy module can also include a nose portion for receiving at least one auxiliary line. Conveniently, the buoyancy module is moulded onto a carousel mechanism and is formed of syntactic foam.

According to a sixth aspect of the present invention there is provided a buoyancy module formed of a buoyant material and being moulded to have a fairing portion, said buoyancy module being adapted to be disposed on a marine riser and to rotate relative to said marine riser, said buoyancy module, when disposed on said riser, produces a minimal increase in effective riser diameter and said fairing in at least one passageway for an auxiliary line. The buoyancy module can have a bulbous nose portion defining at least one passageway for an auxiliary line.

BRIEF DESCRIPTION OF THE DRAWINGS

These and other aspects of the present invention will become apparent from the following description when taken in combination with the accompanying drawings, in which.

DESCRIPTION OF THE PREFERRED EMBODIMENTS

Figure 1A:
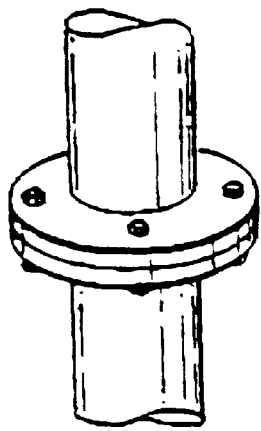
FIG. 1a shows a prior art flange coupling arrangement for connecting two sections of marine riser.
Figure 1B:
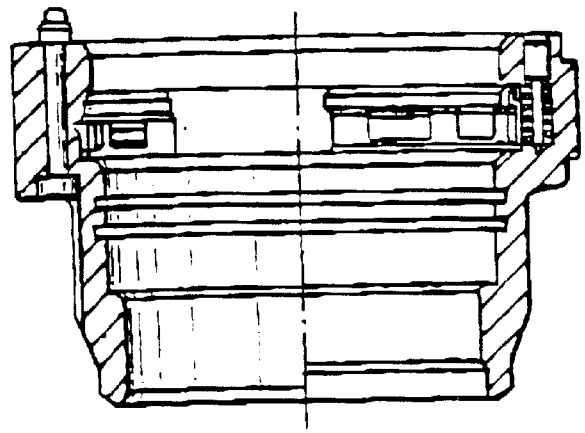
FIG. 1b shows a prior art mechanical coupling arrangement for connecting two sections of marine riser.
Figure 2A:
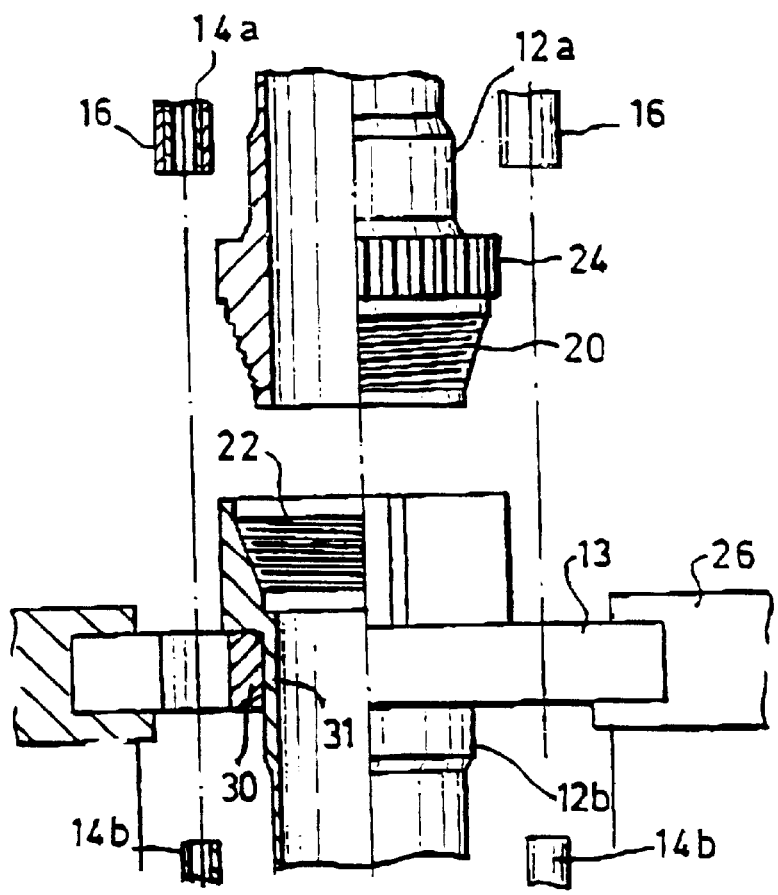
FIG. 2a shows a split-sectional view of two marine riser sections, in accordance with an embodiment of the invention, location in a "stabbing position" immediately prior to connection.

Reference is first made to FIG. 2a of the drawings which shows a second riser section 12a in a "stabbing position" about to be secured to a first riser section 12b which is supported in a riser spider 13. The "stabbing position" is the position of the two riser sections which are to be connected where they have been brought near to each other and aligned ready for connection.

The second riser section 12a has a male screw-threaded end or pin 20 welded to the riser section 12a for engagement with the first riser section 12b. The diameter of pin 20 is wider than the diameter of the second riser section 12a.

The first riser section 12b has a female screw-threaded end or box 22 welded to the end which is to receive the second riser section 12a, and has threads of the same pitch as the pin 20 of the second riser section 12a. Thus, the second riser section 12a may be screwed directly into the first riser section 12b to form a screw-threaded joint. This operation will be described in detail later.

First auxiliary lines, for example kill lines, 14a are connected to the second riser section 12a and second auxiliary lines 14b are connected to the first riser section 12b. The first auxiliary lines 14a have sliding sleeves 16 covering part of each of the first auxiliary lines 14a.

The pin 20 and the box 22 are designed so that the internal diameter of the riser comprising 12a and 12b is uniform throughout the entire length of the composite riser 12. The pint 20 and box 22 are a "Quick Thread" connector set (Drill-Quip Inc).

The second riser section 12a has a circumferential toothed rack 24 with a diameter greater than the diameter of the first riser section 12b. The circumferential toothed rack 24 receives the appropriate rotary drive mechanism to rotate the second riser section 12a for screw-threaded engagement and disengagement with the first riser section 12b, as will be discussed in detail later.

Once the riser sections 12a,12b and the auxiliary lines 14a,14b have been connected the riser spider 13 is retracted, the riser 12 (comprising riser sections 12a and 12b) is lowered so that the top box 22 is just above the riser spider 13, the riser spider 13 is advanced to retain the new riser section 12b as shown in FIG. 2a, and the next riser section to be connected to the riser 12 is lowered and aligned.

The riser spider 13 is mounted in a carrier floor 26 and is movable relative thereto. The riser spider 13 has a wide collar 30 for engaging an annular area 31 at, or near the box 22. This provides a larger surface contact area than with prior art arrangements and minimises stresses applied by the spider 13 to the box 22 and to the riser sections 12a,12b, particularly in difficult weather conditions.

The reason for the larger contact area is to reduce the stress per unit of contact area. This is needed to ensure that no deformation of the box 22 occurs if a marine riser has to support a BOP stack for an extended period.

Figure 2B:
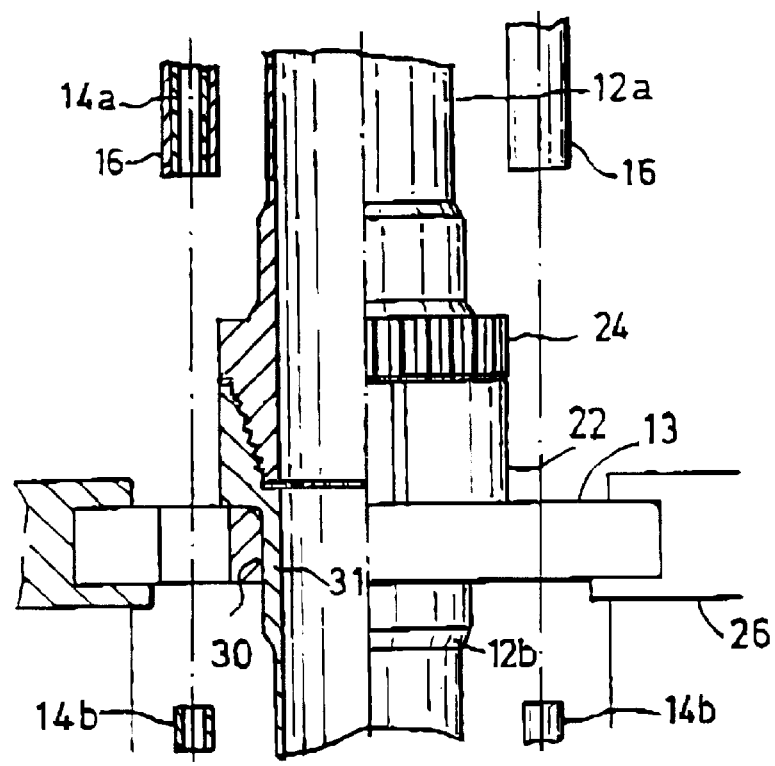
FIG. 2b depicts the marine riser sections in the "stabbed position" prior to "make up"

FIG. 2b depicts the marine riser sections 12 in the "stabbed" position. In the "stabbed" position, riser section 12a is lowered so that the pin 20 engages the box 22. It is not possible to cross-thread the pin 20 and box 22 because the threads of the pin 20 and box 22 are self-aligning. In the "stabbed position" the first auxiliary lines 14a are not connected to the second auxiliary lines 14b. Although the first and second auxiliary lines 14a,14b are shown as aligned in FIG. 2b, they may not be aligned at this point. The auxiliary lines 14 are not necessarily aligned in the "stabbed position" but alignment occurs once the sections are screwed together as will be described below.

Figure 2C:
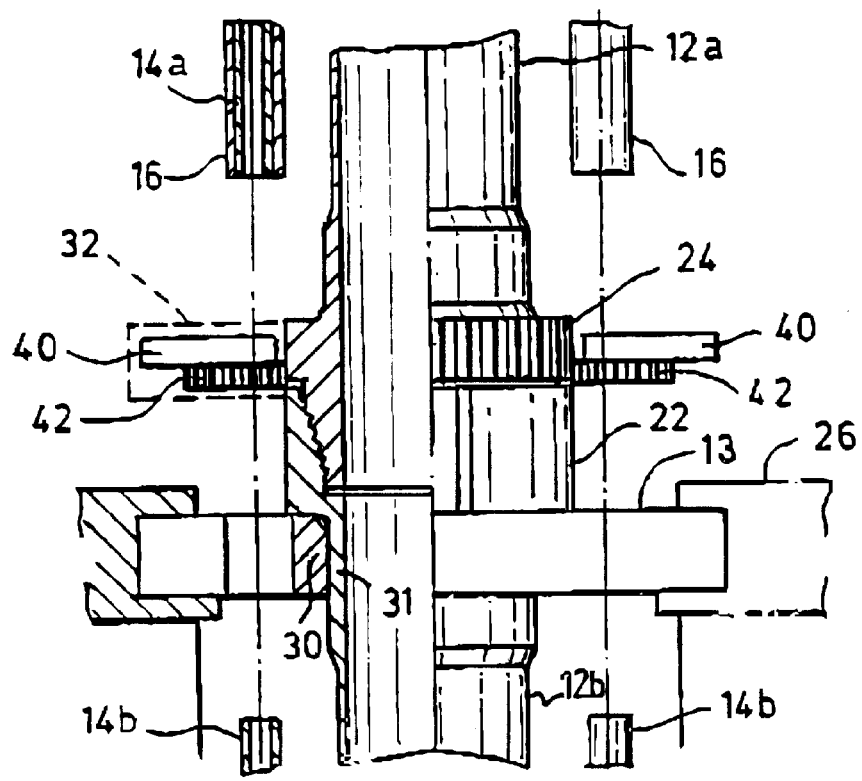
FIG. 2c depicts the rotary drive mechanism engaged with one part of the marine riser prior to "make up"

FIG. 2c shows the rotary drive mechanisms 32 engaged with the second riser section 12a prior to "make-up". The rotary drive mechanisms 32 comprise two rotary drive units 40 which carry rotatable pinions 42 which are rotated thereby. The pinions 42 have a tooth size which is selected to match the tooth size of the circumferential toothed rack 24. The drive units 40 are brought towards the second riser section 12a until the pinions 42 are in the meshing engagement with the toothed rack 24. At this time the auxiliary lines 14 are in the retracted position so that the pinions 42 are not obstructed by the auxiliary lines 14.

Figure 2D:
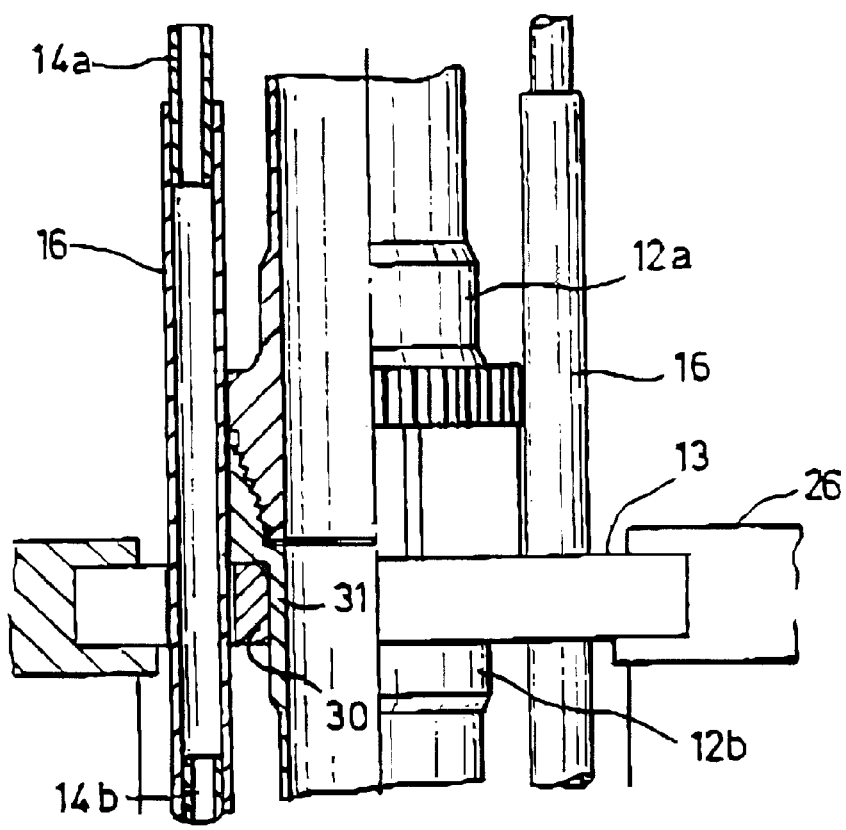
FIG. 2d shows the marine riser sections fully "made up" following actuation of the drive mechanism, and the auxiliary lines also connected.

Once the pinions 42 and the rack 24 are engaged, the drive units 40 then drive the pinions 42 which, in turn, rotate the second riser section 12a until the second riser section 12a is screwed into the first riser section 12b to reach the position shown in FIG. 2d. Once the two main riser sections 12a,12b are fully secured, the drive units 40 are withdrawn.

FIG. 2d shows the marine riser sections 12a,12b fully "made-up" and the auxiliary lines 14 also connected. The difference between the "stabbed" and the "made-up" positions is that in the "made-up" position, the riser sections are screwed together, "anti-breakout keys" (driving connectors with positive anti-rotation), such as Type S-60D Connectors made by Drill-Quip Inc., are fitted to prevent undesired "breakout" of the screw-thread connection when the riser 12 is in use, the auxiliary lines 14a,14b are aligned, and the sliding sleeves 16 which cover part of the first auxiliary lines 14a in the "stabbed position" are moved downwards to cover part of the second auxiliary lines 14b. Thus, in the "made-up" position, the sliding sleeves 16 connect the auxiliary lines 14a,14b by covering both the first auxiliary lines 14a and the second auxiliary lines 14b. This technique of connecting the auxiliary lines 14 using sliding sleeves 16 is well-known in the art. Once the two riser sections 12a,12b and corresponding auxiliary lines 14a,14b have been connected, the riser spider 13 is retracted, the assembled sections are lowered into place, and the procedure is repeated for subsequent sections.

Figure 3:
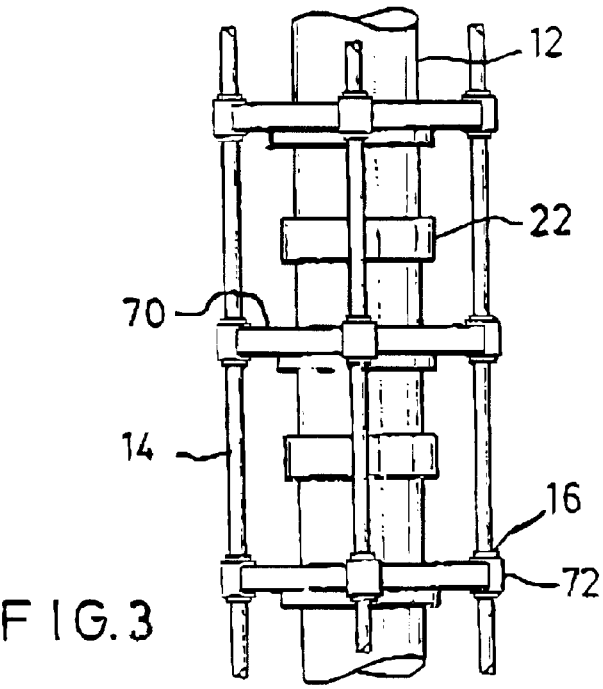
FIG. 3 is a diagrammatic view of several sections of marine riser and auxiliary lines assembled.

Reference is now made to FIG. 3 which is a diagrammatic view of several sections of marine riser and auxiliary lines assembled. It will be seen that the auxiliary lines 14 are spaced apart around the riser 12 and are parallel to the riser 12; the means by which these lines 14 are so disposed will now be described in detail.

Figure 4A:
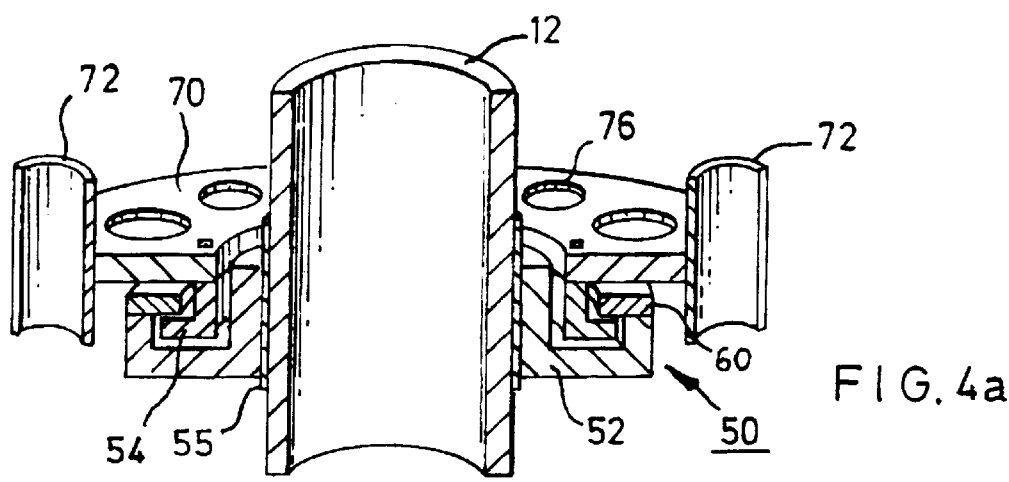
FIG. 4a shows an enlarged and perspective sectional view of one of the auxiliary line supports shown in FIG. 3 which is used for securing the auxiliary lines to the marine riser.
Figure 4B:
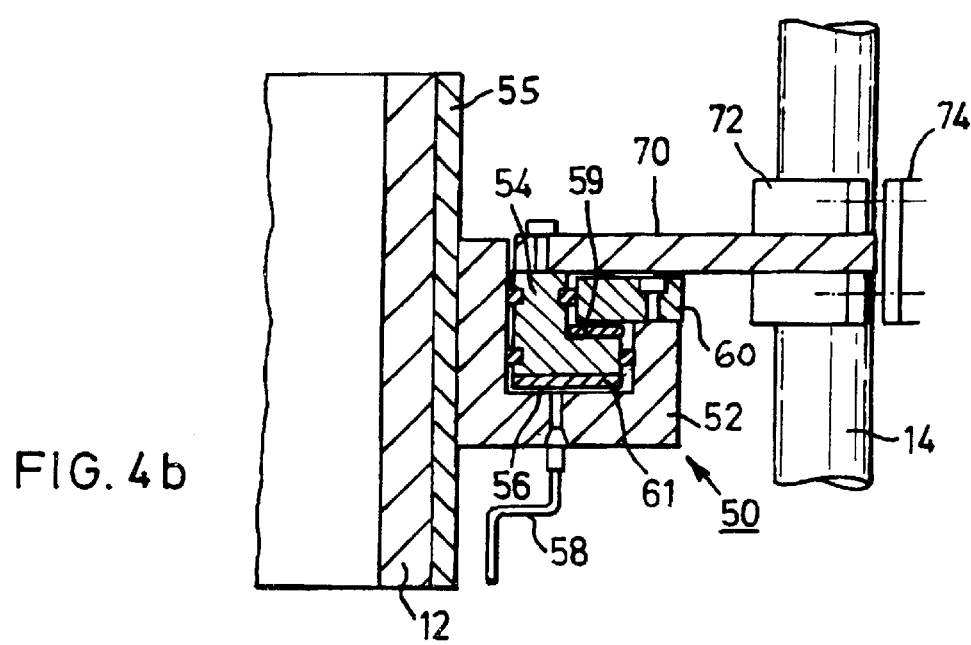
FIG. 4b is a sectional view of part of the support shown in FIG. 4a and shows the rotatable bearing mechanisms for allowing rotation of the lines relative to the marine riser.

FIGS. 4a and 4b are diagrams of part of a riser section showing a carousel, a rotatable support mechanism 50. The carousel 50 has an annular bracket 52 which is U-shaped in cross section (see FIG. 4b) and which carries an L-shaped annular piston 54. The annular bracket 52 is manufactured in two halves to allow installation and removal. Threaded bolts are received by corresponding threaded apertures (this feature is not shown in FIGS. 4a and 4b) allowing the bracket halves to be securely clamped to the riser via the rubber sleeve 55.

As best seen in FIG. 4b, the piston 54 is supported on hydraulic bearings 56 provided with hydraulic fluid from a hydraulic pipe 58. The hydraulic pipe 58 supplies fluid to balance the downward force acting on the piston 54 due to the carousel mechanism including the auxiliary lines and anything else secured to the carousel such as buoyancy aids or fairings. Teflon pads 59, 61 are disposed on upper and lower surfaces of the piston 54 to facilitate movement of the piston 54 in the bracket 52 if there is a loss of hydraulic fluid. The piston 54 is prevent from rising out of the annular bracket 52 by an annular collar 60 which is bolted to the annular bracket 52 after the piston 54 has been inserted.

An aperture annular disk 70 is bolted to the piston 54. The outside diameter of the apertured annular disc 70 is approximately 48 inches (120 cm), the internal diameter is approximately 21 inches (53 cm). For each auxiliary line 14, the apertured annular disc 70 has an associated clamp 72 with a moveable jaw 74 which is openable to allow insertion of an auxiliary line 14 into the clamp 72, as shown in FIG. 4b. After insertion, the jaw 74 is closed to hold the inserted auxiliary line 14, and then secured to the clamp 72 to ensure that the jaw 74 does not release the auxiliary line 14 in use.

Correct spacing between auxiliary lines at the level of each carousel is ensured by the annular disc 70 which holds all of the auxiliary lines 14. The annular disc 70 contains a number of apertures 76 which are disposed in the annular disc 70 to reduce the weight of the disc 70.

The bearings 56, in conjunction with the hydraulic pressure applied through the hydraulic pipe 58, allow the piston 54 to rotate freely relative to the bracket 52. The clamp 72 is large enough to accommodate the sliding sleeve 16 in addition to the auxiliary line 14.

This structure allows the auxiliary lines 14 to move relative to the bracket 52, which is connected to the riser section 12a via the rubber sleeve 55, as the riser section 12a is being rotated. Thus, when the second main riser section 12a is being rotated by the rotatable pinions 42 to screw the second main riser section 12a into place, the carousel mechanism, auxiliary lines, and other supported items such as buoyancy aids and or fairings are able to rotate with the riser pipe or can remain stationary. Thus, any torsional force applied to the auxiliary lines 14 will be minimal.

Once the main rider sections 12a, 12b have been secured together, hydraulic pressure can then be applied to the carousel via the hydraulic pipe 58 to allow the piston 54 to float, thus allowing easy rotation and alignment of the auxiliary lines 14. Upon alignment, the sliding sleeves 16 are moved downwards to connect all of the auxiliary lines 14.

Figure 5:
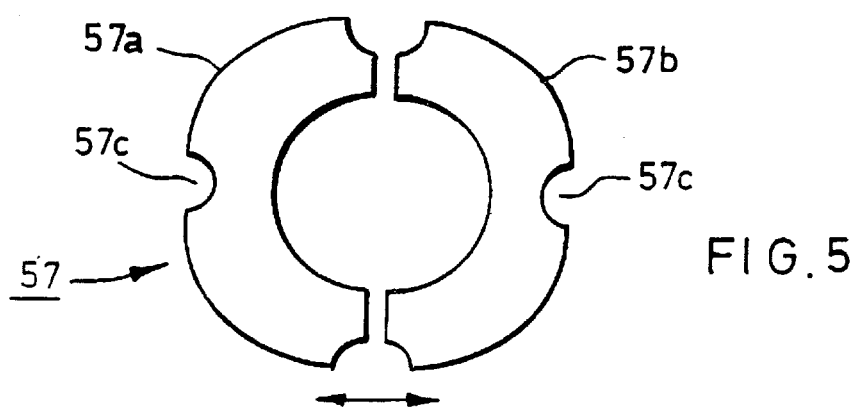
FIG. 5 is a plan view of one of the buoyancy modules for connection to a riser.

The riser sections 12a,12b may also have buoyancy modules attached along the length of the riser to reduce the effective weight of the riser 12 when it is submerged in water. A plan view of the two split sections comprising a buoyancy module 57 is shown in FIG. 5. The buoyancy module 57 fits around the perimeter of the riser 12 for enhanced stability of the riser 12. The buoyancy module 57 is composed of two moulded sections 57a and 57b which are clamped together and retained on the carousel 50 to allow rotation. The sections 57a,b have recesses 57c to receive and retain auxiliary lines 14. The sections 57a,57b are made of syntactic foam, which is an epoxy resin and buoyant material, and which reduces the effective weight of the riser joints when placed into sea water.

Figure 6:
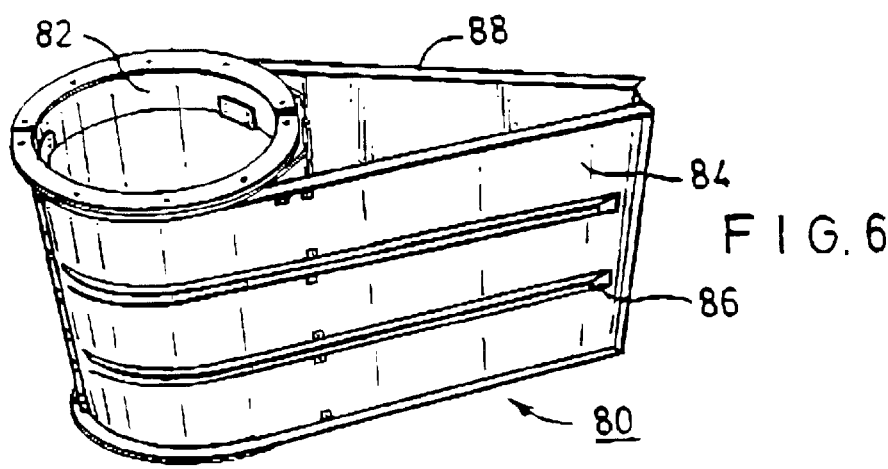
FIG. 6 is a perspective view of a fairing.
Figure 7:
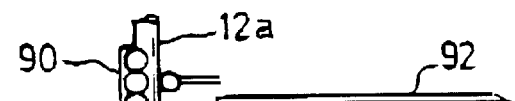
FIG. 7 is a diagrammatic view of several fairings made from buoyant material attached to a marine riser which is being lowered from an oil rig into water.
Figure 7:
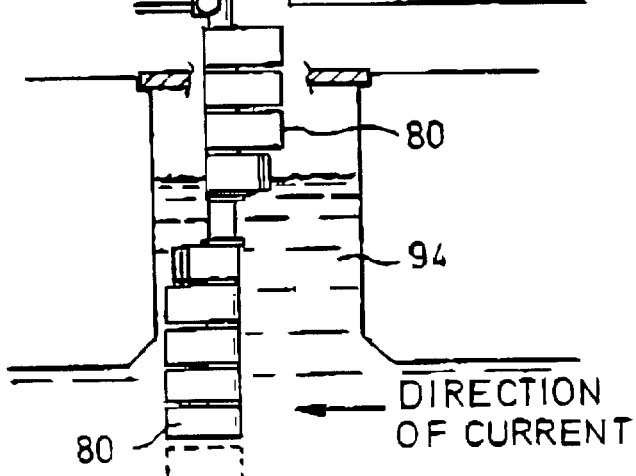

Reference is now made to FIGS. 6 and 7 which show a marine riser fairing 80 and a marine riser assembled with a plurality of these fairings 80 respectively. Fairings 80 are only needed for deep water sites or where the currents are very strong, this usually occurs in only 5% of situations.

The fairing 80 is designed to reduce the low pressure area generated by currents on the downstream side of the riser 12 and therefore reduces vortex shedding. The ring 82 enables the fairing 80 to fit around the perimeter of the riser 12. A tapered shell 84 surrounds the bearing ring 82. Reinforcing ribs 86 are used to strengthen the shell 84. The internal volume 88 of the fairing 80 may be filled with a buoyant material such as syntactic foam.

FIG. 7 shows part of a marine riser with nine fairings 80 mounted at the top part. Prior to mounting the fairings 80 a current survey analysis of the water is performed to determine the current speed and direction at different depths. The current profile is used to determine if all of the riser or a part of the riser needs to have fairings fitted to it. Due to the design of the carousel 50 the fairings will self align into the direction of the current which may on occasion turn through 180° during a twelve hour period due to tidal activity. Thus, the fairings 80 situated on the lowest riser section will be aligned for the current at a deeper location; whereas, the fairings situated on the highest riser sections will be aligned for the current at a shallower level.

Figure 8:
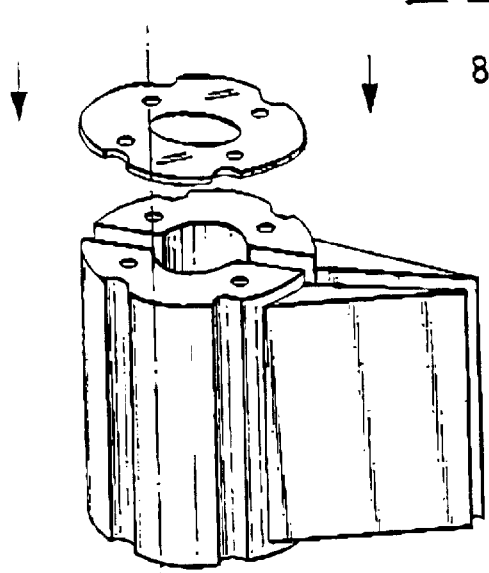
FIG. 8 is an exploded perspective view of a composite buoyancy module and fairing.
Figure 8:
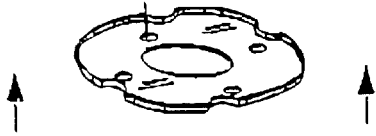

The marine riser section 12a may be centred by a riser centering device 90 situated in the "cellar deck" 92 of the drilling vessel. Due to the design of the carousel mechanism 50 and the ability to mould syntactic foam buoyancy material to any reasonable shape, the buoyancy modules are manufactured in the shape as shown in FIG. 8. These fairing shaped buoyancy modules are installed into the carousel 50 and therefore perform the dual functions of reducing the effective weight of the riser in sea water and reducing the effects of current and vortex shedding as previously described.

Figure 9:
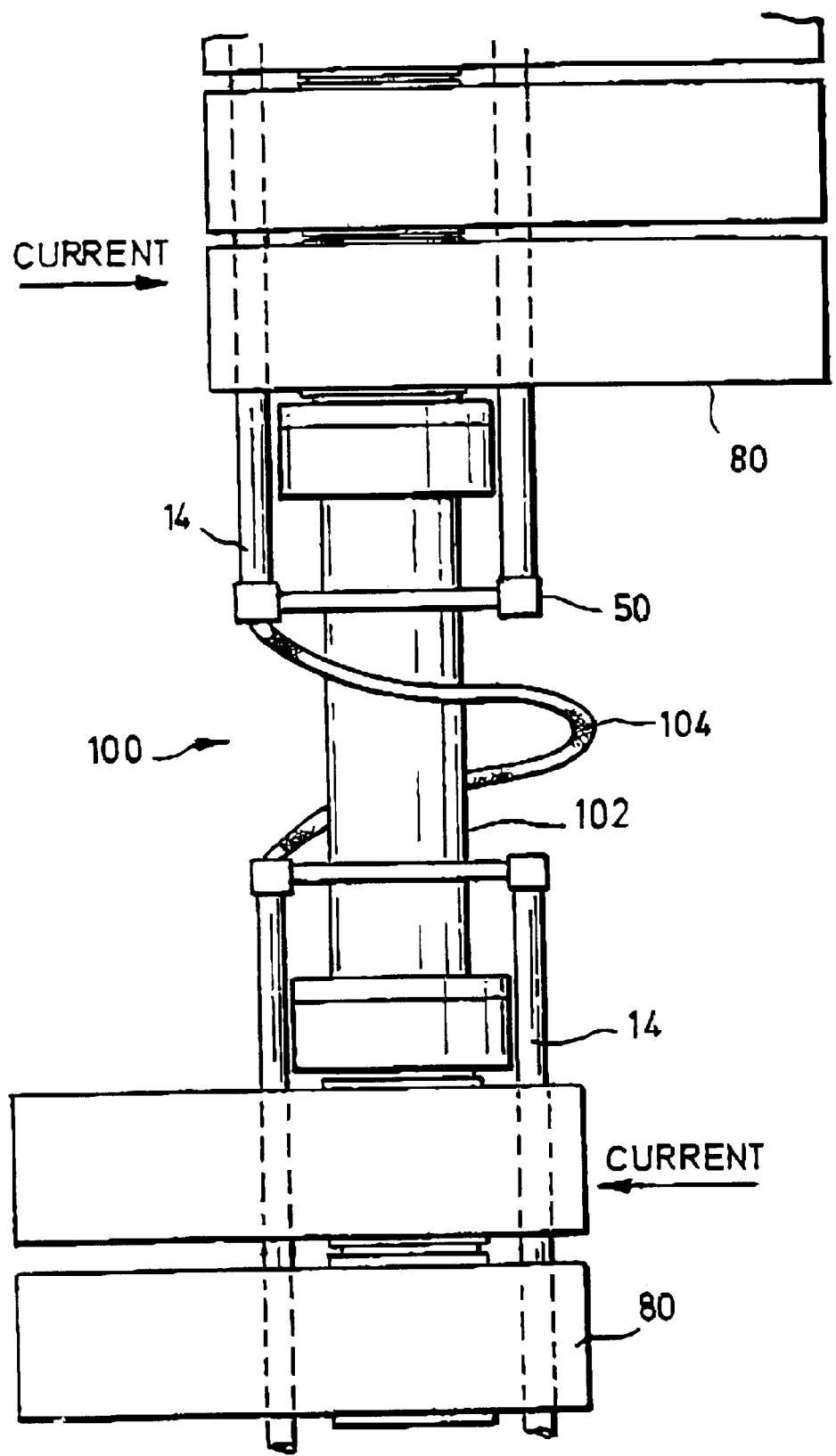
FIG. 9 is a side view of a riser with fairings and a flexible riser cross-over joint.

As currents may change and reverse direction at different water depths, specially designed riser cross-over joints are required to enable any fairings 80 installed on the riser to self-align in response to current flow. FIG. 9 shows a riser cross-over joint generally indicated by reference numeral 100 provided by a riser section 102 with a flexible riser cross-over hose 104 to enable fairings 80 on either side of the riser section 102 to self-align. These cross-over joints 100 have no fairings 80 or buoyancy modules fitted. The hose 104 (co-flexip type) connects to the auxiliary lines 14 and are of the type used in BOPs.

It will be appreciated that various modifications may be made to the embodiment hereinbefore described, without departing from the scope of the invention. In particular, it will be appreciated that the pin 20 and box 22 may have parallel screw-threaded ends rather than the tapered screw-threaded ends shown. The pin 20 and box 22 are welded to the riser in the embodiment shown, but they could be secured using any other convenient technique.

The embodiment described relates to marine drilling risers which use a minimum of two auxiliary lines. However, other embodiments of the present invention may relate to marine workover/completion risers which may only need one auxiliary line.

In the embodiment described a single piston 54 was used, however, more than one piston may be used. Where more than one piston 54 is used, a disc segment corresponding to each piston 54 is used to retain each auxiliary line 14 instead of a single annular disc 70 to retain all of the auxiliary lines 14. Spacers are used to connect adjacent disc segments and retain the spacing between the auxiliary lines.

The annular collar 60 is preferably bolted to the annular bracket 52 in the above embodiment but other methods of securing the collar to the bracket could be used, for example welding. Similarly, although the jaw 74 is bolted to the clamp 72 in the above embodiment, other methods may be used to secure the jaw and the clamp together, for example a latch arrangement may be used. Similarly, other methods of securing the two sections of buoyancy module together, for example bolting, may be used. More than two sections may be used for each buoyancy module.

In the embodiment described, a circumferential toothed rack 24 and rotary drive wheels or pinions are used, however, in other embodiments machined drive keyways and drive keys may be used in conjunction with a split drive ring arrangement instead. In the embodiment described, hydraulic bearings 56 are used to mount the moveable elements 54 in the bracket 52, in other embodiments other hydraulic or pneumatic bearings may be used. In the embodiment described, the fairing 80 is filled with syntactic foam, but in other embodiments, the entire fairing may be combined with the buoyancy module and moulded from buoyant material (as shown in FIG. 8, see sheet 3/6), or the tapered shell may be moulded from buoyant material. In the embodiment described, syntactic foam is used, but in other embodiments, any convenient non-absorbent material may be used.

It will be appreciated that with the design of risers and buoyancy modules hereinbefore described with reference to FIGS. 1 to 9, existing syntactic foam buoyancy designs are rigidly strapped or secured to the outside diameter of the main riser tube body providing an outside diameter of approximately 46 inches, when used with 21 inches O.D. marine drilling riser. When the riser is disposed in high currents, this size of buoyancy module, even with a fairing, may introduce an effect known as vortex shedding. In order to reduce the effect or vortex shedding, it is therefore desirable to present as small diameter of riser and buoyancy module as possible towards the current, thereby reducing the "sail area" presented to the flow of current.

With the risers and buoyancy modules hereinbefore described with reference to FIGS. 1 to 9, it will be appreciated that the outside diameter of the buoyancy material is dictated to large extent by the outside diameter of the choke, kill and other auxiliary lines fitted to the main riser tube body and these are, in turn, normally arranged around the buoyancy module, and hence the riser, in a symmetrical pattern as best seen in FIGS. 5 and 8 of the drawings.

It will be understood that various modifications may be made to the embodiments hereinbefore described without departing from the scope of the invention. For example, the riser screw-threaded ends may be female in which case an intermediate dual male screw-threaded coupler may be provided so that the dual male coupling is first screwed into the secured female end of a secured riser section and then the female end of the second riser section is screwed onto the second male thread of the coupling. A similar result could be achieved using risers with only male threaded ends and having a coupling with dual female threads. All auxiliary lines may be simultaneously lifted upwards within the carousel mechanism by a hydraulic/pneumatic jacking system to provide access for the rotary drive mechanism. In this case, when the auxiliary lines are subsequently lowered a threaded connection with a "hammer union" system such as a FMC Dynetor of WECO coupling may be used to provide a "metal to metal seal".

Figure 10:
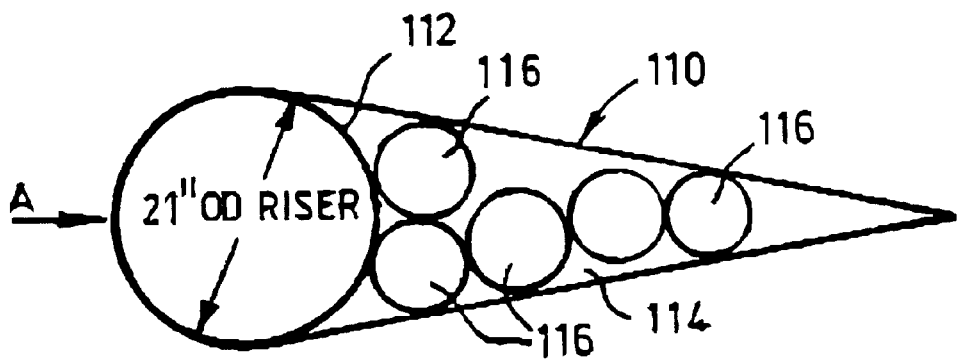
FIG. 10 is a plan view of the first embodiment of riser and buoyancy module according to a further aspect of the invention.
Figure 11:
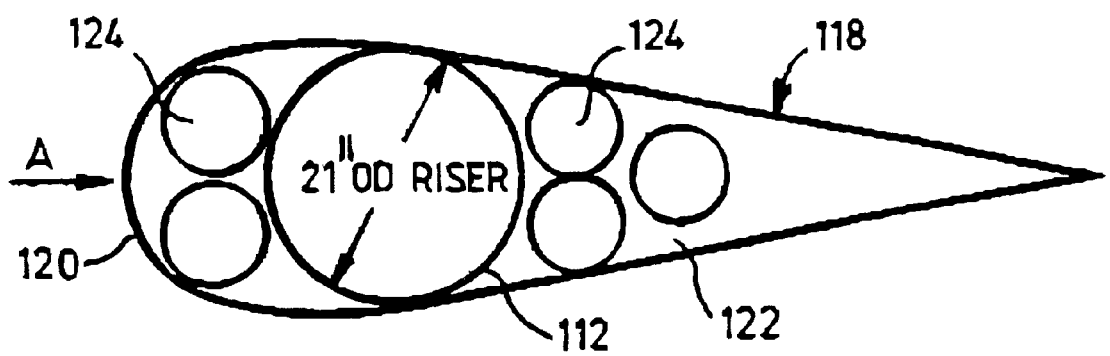
FIG. 11 is a plan of a second embodiment of a riser and buoyancy module according to a further aspect of the invention.

Reference is now made to FIGS. 10 and 11 of the drawings which depict a first and a second embodiment respectively of a further aspect of the present invention in which the syntactic foam buoyancy material is moulded into the carousel mechanism similar to that shown in FIGS. 6 and 8 and is also formed into the shape of a fairing such that the outside diameter of the carousel, buoyancy and fairing is limited to about the riser diameter (O.D. 21 inches), that is approximately 23 inches at the point presented in "aspect" to the current flow shown by the arrows A.

This embodiment relates to a further aspect of the invention provides a further improvement in which the syntactic buoyancy material is incorporated into a fairing profile to reduce or eliminate vortex shedding.

Reference is now made to FIG. 10 of the drawings which depicts a buoyancy module, generally indicated by reference numeral 110, which is moulded into a carousel mechanism and disposed around a 21 inches marine riser pipe 112. The buoyancy material is formed into the shape of the fairing 114 such that the outside diameter of the carousel buoyancy and fairing is limited to approximately 23 inches at the point presented in "aspect" to the current flow. This means that the maximum diameter of the combination of the riser and the foam sleeve is 23 inches at its broadest aspect. It will be appreciated that this represents about 50% of the "aspect diameter" presented to current flow (i.e. 46 inches) using the embodiments hereinbefore described with reference to FIGS. 1 to 9 of the drawings. The advantage of this arrangement is that is significantly reduces the effect of current and, consequently, vortex shedding. It will also be seen that in the embodiment in FIG. 10 the choke and kill lines, generally indicated by reference numerals 116, are disposed into fairing shape and are consequently able to rotate with the fairing on the carousel in a similar manner as to the rotation of lines with the carousel hereinbefore described with reference to FIGS. 1 to 9.

Reference is now made to FIG. 11 of the drawings which depicts an alternative embodiment to that shown in FIG. 10. In this case, the syntactic foam buoyancy module 118 is moulded around riser 112 such that the flow modules has a leading end 120 and a tail or fairing end 122, the tail 122 being similar to fairing end 114 shown in FIG. 10. In this embodiment it will be appreciated that the flow module in the leading end 120 is sufficiently large to accommodate some of the choke or kill lines 124 with the other choke or kill lines 124 being disposed within the fairing section 122. In this embodiment it will be appreciated that the outside diameter of the carousel, buoyancy and fairing is also limited to approximately 23 inches at the widest point presented in "aspect" to the current flow (Arrow A). However, in this case, some of the choke and kill lines are disposed in the leading end 120. In this embodiment the coupling of the choke and kill lines and buoyancy modules to the riser and carousel is achieved in the manner similar to that for FIG. 10 and as described with reference to FIGS. 1 to 9 of the accompanying drawings.

It will be appreciated that with the embodiments described with reference to FIGS. 10 and 11 the principal advantage is the reduction or limitation of vortex shedding and, in addition, the reduction of the effective "sail area" by about 50% in reducing the effective diameter from about 46 inches to 23 inches. This considerably reduces the effect of the current on the riser.

It will also be appreciated that various aspects may be made to the embodiments shown in FIGS. 10 and 11 without departing from the scope of the invention. For example, the appropriate number of choke and kill lines etc. may be integrally formed with the buoyancy module which can then be strapped onto the riser section as shown in FIGS. 10 and 11. Choke and kill lines passing down through the modules can simply be coupled together using coupling elements. Alternatively, conduits may be cast in the buoyancy modules for receiving the choke and kill lines. A further modification to the modules shown in FIGS. 10 and 11 is that they may be manufactured in two parts and clamped together around the riser in a manner similar to that shown in FIG. 8, although it will be appreciated that the parts need not be exact halves, or even symmetrical. The buoyancy modules may be used with various diameters of risers to reduce the effective riser diameter.

It will be appreciated that the principal advantage of the first aspect of the present invention is that for a given weight of connection it provides a higher strength coupling than the prior art couplings; the riser sections can be assembled faster than some prior art designs and the riser assembly is less expensive. Another advantage of the first aspect of the present invention is that less maintenance is required compared with other couplings because the main connector mechanism is a simple threaded design, whereas other couplings rely on many small components. Yet another advantage is that it allows faulty screw-thread joints to be removed from the main riser 12 and replaced without having to disconnect the auxiliary lines 14, simply by removing the pin 20, the box 22, or both and welding on replacement items. Due to the relatively low cost of the threaded pins and boxes they may be considered expendable when damaged. The sliding sleeve 16 connection can accommodate any slight changes in length of the main riser 12. The principal advantage of the improved buoyancy module is that it significantly reduces the effect of the current because it reduces the effective "aspect diameter" and hence it reduces the effect of vortex shedding.

What is claimed is:

1. A marine riser comprising:
   a plurality of marine riser sections, each marine riser section having screw-threaded ends and coupling means for connecting said screw-threaded ends together; rotary drive coupling means for engaging with a rotary drive mechanism; each marine riser section having a plurality of spaced brackets secured to the marine riser section along its length; auxiliary line support means for receiving at least one auxiliary line, said auxiliary line support means being rotatably mounted to said spaced brackets whereby, when two marine riser sections are coupled together by rotary movement the auxiliary line support means is free to rotate relative to the riser sections to minimise rotary forces being applied to the auxiliary lines and allow vertical alignment of auxiliary lines for connection.

2. A marine riser as claimed in claim 1 wherein an auxiliary lines coupling mechanism is provided for coupling auxiliary lines on adjacent riser sections together.

3. A marine riser as claimed in claim 2 wherein the auxiliary lines coupling mechanism is a sliding sleeve.

4. A marine riser as claimed in claim 2 wherein the auxiliary lines coupling mechanism is a hydraulic or pneumatic jacking system for lifting all auxiliary lines upward simultaneously.

5. A marine riser as claimed in claim 1 wherein the auxiliary line support means is rotary carousel mechanism which comprises an annular disc with a clamp corresponding to each auxiliary line for receiving an auxiliary line.

6. A marine riser as claimed in claim 5 wherein the auxiliary line support means is mounted in the spaced brackets by hydraulic bearings.

7. A marine riser as claimed in claim 1 wherein each riser section has a male screw-threaded end and a female screw-threaded end.

8. A marine riser as claimed in claim 7 wherein the male and female screw-threaded ends have tapered screw-threads.

9. A marine riser as claimed in claim 7 wherein the male and female screw-threaded ends have parallel screw-threads.

10. A marine riser as claimed in claim 7 wherein the male and female screw-threaded ends are welded to the riser sections.

11. A marine riser as claimed in claim 1 wherein each riser section has female screw-threaded ends, said coupling means being provided by a dual male threaded coupling adapted to be screw fitted between adjacent riser sections.

12. A marine rinser as claimed in claim 11 wherein said male threaded couplings and said female screw-threaded ends are tapered screw-threads.

13. A marine riser as claimed in claim 11 wherein said male threaded couplings and said female screw-threaded ends have parallel screw-threads.

14. A marine riser as claimed in claim 1 wherein the rotary drive coupling means is a circumferential toothed rack.

15. A marine riser as claimed in claim 1 wherein the rotary device mechanism comprises rotary drive pinions and a drive unit.

16. The marine raiser of claim 1 further comprising a fairing for use with said marine riser, the fairing comprising a first generally cylindrical portion for coupling to the riser and a second tapered portion coupled to the first portion, the fairing including buoyant material.

17. A fairing as claimed in claim 16 wherein the first and second portions are molded from buoyant material.

18. A fairing as claimed in claim 16 wherein only the second portion is molded from buoyant material.

19. A fairing as claimed in claim 16 wherein the second portion has an insert made of buoyant material.

20. A fairing as claimed in claim 16, wherein the buoyant material is non-absorbent syntactic foam.

21. The marine riser of claim 1 further comprising a fairing-shaped buoyancy module, said buoyancy module having a carousel coupling means for coupling the buoyancy module to a carousel mechanism mounted on said riser, said buoyancy module being rotatable relative to said riser, said buoyancy module having a tapering fairing portion coupled to the carousel coupling means, the tapering portion being formed of a buoyant material and defining within the boundary of the tapering portion at least one passageway for said auxiliary line.

22. A buoyancy module as claimed in claim 4 wherein the tapering portion includes a plurality of passageways for a respective plurality of auxiliary lines.

23. A buoyancy module as claimed in claim 22 wherein said buoyancy module includes a nose portion coupled to said carousel mechanism, said nose portion being formed of a buoyant material and being disposed, when on said marine rinser, in a substantially diametrically opposed position to said tapering fairing, said nose portion defining at least one passageway for an auxiliary line.

24. A buoyancy module as claimed in claim 21 wherein said buoyancy module is molded into said carousel mechanism.

25. A buoyancy module as claimed in 21 wherein said buoyant material is syntactic foam.

26. The marine riser of claim 1 further comprising a buoyancy module formed of a buoyant material and being molded to have a fairing portion, said buoyancy module being adapted to be disposed on said marine riser and to rotate relative to said marine riser, said buoyancy module, when disposed on said riser, produces a minimal increase in effective riser diameter and said fairing portion in at least one passageway for an auxiliary line.

27. A buoyancy module as claimed in claim 26 wherein said module includes a nose portion of buoyant material, said nose portion defining at least one passageway for an auxiliary line.

28. A marine riser section comprising:
   screw-threaded ends and coupling means for connecting said screw-threaded ends together;
   rotatable drive coupling means for engaging with a rotary drive mechanism;
   a plurality of spaced brackets secured to the marine riser section along its length;
   auxiliary line support means for receiving at least one auxiliary line, said auxiliary line support means being rotatably mounted to said spaced brackets, whereby the auxiliary line support means is free to rotate relative to the riser section to minimize rotary forces being applied to the auxiliary lines and allow easy rotation of auxiliary lines.

29. A marine riser as claimed in claim 28 wherein the auxiliary line support means is a rotary carousel mechanism which comprises an annular disc with a clamp corresponding to each auxiliary line for receiving an auxiliary line.

30. A method of connecting marine riser sections together to form a marine riser, said method comprising the steps of: supporting a first riser section to display a first screw-thread end for coupling; locating a second riser section above the first riser section, where the second riser section has a second different screw-thread end for coupling to the said first end; rotating said second riser section such that the first and second ends form a screw-thread coupling; and coupling at least one auxiliary line to the riser section and allowing the auxiliary line to rotate freely relative to the riser to facilitate vertical alignment with adjacent riser sections.

31. A method as claimed in claim 30 wherein the first riser section is supported by means of a riser spider.

32. A method as claimed in claim 31 wherein said method further includes a step of advancing the riser spider to support the first riser section and a step of retracting said riser spider to release the first riser section.

33. A method of connecting marine riser sections together to form a marine riser, said method comprising the steps of: supporting a first riser section to dispose a first female screw-thread end for coupling; locating a second riser section above the first riser section, said second riser section having a female screw-threaded end for coupling; providing a dual male threaded riser coupling between said first and second riser sections and securing the coupling to said first riser section and then rotating said second riser section such that the cond riser and said dual threaded coupling first and seform a threaded riser coupling; and coupling at least one auxiliary line to the riser section and allowing the auxiliary line to rotate freely relative to the riser to facilitate vertical alignment with adjacent riser sections.

34. A method as claimed in claim 33 wherein the first riser section is supported by means of a riser spider.

35. A method as claimed in claim 33 wherein the method further includes a step of advancing the riser spider to support the first riser section and a step of retracting said riser spider to release the first section.

* * * * *